2,779,738

OXIDATION-INHIBITED MINERAL OIL COMPOSITIONS

Joseph J. McBride, Jr., Cranford, N. J., assignor to Tidewater Oil Company, a corporation of Delaware No Drawing. Application May 6, 1953,
Serial No. 353,450

6 Claims. (Cl. 252—49.6)

The present invention relates to improved mineral oil compositions and, particularly, to oxidation-inhibited mineral oil compositions of lubricating grade.

The compositions embodied by the present invention comprise a mineral oil in major amount, based on the weight of the composition, and a small amount, sufficient to impart oxidation-inhibiting characteristics to said oil, of an oil-soluble silicon- and nitrogen-containing compound as more fully described hereinafter.

With reference to the mineral oil component of the compositions embodied herein, usage is contemplated of mineral oil fractions of refined or unrefined types that may vary over a rather wide range with respect to viscosity, viscosity index and other characteristics and to which fractions it is desired to impart improved anti-oxidation characteristics. Illustrative embodiments relate to mineral oil fractions of highly refined type such as those known to the art as solvent extracted oils, acid treated oils, and the like, or fractions derived from petroleum and useful for particular purposes without resort to extensive refining operations. In a particular embodiment, the mineral oil may be a heavy or light mineral oil fraction, or blend of such fractions, of suitable viscosity characteristics for lubrication purposes, such as those useful for lubrication of internal combustion engines, turbines, etc.

The silicon- and nitrogen-containing compounds embodied for use herein as anti-oxidants for mineral oils are characterized by having the four valences of the silicon atom attached to carbon atoms and of the following general formula:

wherein R' is a dialkylaminoaryl group and R is an alkyl group or has the same significance as R'. Thus, embodied for use herein are silicon- and nitrogen-compounds of the following formulas with R and R' of the aforesaid significance: $SiR'_4$, $RSiR'_3$, $R_2SiR'_2$ and $R_3SiR'$. As aforestated R', as well as R when it has the same significance as R', is a dialkylaminoaryl group that is structurally illustrated by the group

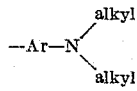

in which the alkyl group may be methyl, ethyl, propyl, butyl or a higher alkyl group, and Ar is an aryl group, preferably phenyl, although other aryl groups such as naphthyl are contemplated. When R in the generic formulas set forth hereinbefore does not have the same significance as R', it may be an alkyl group that includes methyl, ethyl, propyl, butyl or a higher alkyl group. More specifically, compounds contemplated herein include dimethyl-bis-(p-dimethylaminophenyl)-silane, diethyl-bis-(p-dimethylaminophenyl)-silane, trimethyl (p-dimethylaminophenyl)-silane, methyl-tris-(p-dimethylaminophenyl)-silane, tetra-(p-dimethylaminophenyl)-silane, dimethyl bis - (dimethylaminonaphthyl) - silane, and the like. Since no invention is claimed herein to the aforesaid compounds per se, it is not deemed essential to describe the preparation thereof in detail herein. For purposese of illustration, however, a preparation method comprises reacting a suitable partially halogenated silane with a suitable organo-metallic compound such as an alkali metal dialkylarylamine. Specifically, a compound such as p-lithium dimethyl aniline may be reacted with a chlorine-containing silane, e. g. dimethyl dichlorosilane, under conditions such that the chlorine atoms in the silane react with the lithium to form lithium chloride and replace the chlorine in the silane with dimethylaniline. Obviously, depending on the particular halogen-containing silane employed, an amount of organo-metallic compound is used for the reaction so as to replace all of the chlorine atoms in the silane with dimethyl aniline. Thus, using dimethyl dichlorosilane, two mols of the metal compound are reacted therewith to produce dimethyl-bis-(p-dimethylaminophenyl)-silane; using trimethyl chlorosilane, one mol of the metal compound is reacted therewith to produce trimethyl (p-dimethylaminophenyl)-silane. Similarly, alkyl trichloro silanes may be reacted with three mols and tetrachlorosilane with four mols of the metal compound to produce compounds of the aforesaid formulas $RSiR'_3$ and $SiR'_4$, respectively.

For purposes of illustration without intent of limitation, the invention is described more fully hereinafter by use of dimethyl-bis-(p-dimethylaminophenyl)-silane as the anti-oxidation ingredient for mineral oil compositions as embodied herein. A specific composition was prepared by dissolving, in a furfural refined lubricating oil having a viscosity of 150 SUS at 100° F., 0.25% by weight of dimethyl-bis-(p-dimethylaminophenyl)-silane. The composition, as well as the uninhibited oil per se, was subjected to test in accordance with the following test procedure for determination of oxygen absorption characteristics of the compositions under test.

Test procedure 250 grams of the oil composition, 74–75 square inches of iron wire and 10 square inches of copper wire are placed in a container having an inlet for oxygen and an exit tube for oxidation products and unused oxygen, the aforesaid metals being maintained immersed in the oil. Oxygen is bubbled through the oil (maintained at 150° C. and at atmospheric pressure) at the rate of 30.35 liters per hour for a period of 64 hours. The difference between the amount of oxygen bubbled through the oil and the amount of unused oxygen over the 64-hour period is indicative of the oxidation characteristics of the composition.

When subjected to the foregoing test, the oil composition containing the anti-oxidant embodied for use herein absorbed an average of 66 ml. of oxygen per hour, whereas the uninhibited oil per se absorbed an average of 110 ml. of oxygen per hour, thus illustrating the increased resistance to oxidation provided by anti-oxidants embodied for use herein.

Although a concentration of 0.25 percent by weight of inhibitor was used in the foregoing illustrative example, such a concentration has been employed for purposes of illustration and not limitation as the invention embodies oil compositions containing amounts of the stated inhibitors other than the amount specifically set forth. Thus, oil compositions are contemplated containing the inhibitors in smaller or larger amounts than specifically set forth hereinbefore, with the actual concentration employed being dependent upon intended usage of the oil composition, coupled with consideration from an economic viewpoint of the minimum amount of inhibitor suitable for imparting desired anti-oxidant properties to the oil under conditions of intended usage. For most purposes, however, an amount of the inhibitor within a range of about 0.1 to 2.0 and, in some cases, up to about 5% by weight of the composition may be suitably used.

Although the present invention has been described in conjunction with certain preferred embodiments thereof, those skilled in the art will readily recognize that variations and modifications can be made. Such modifications and variations are to be considered to be within the purview of the specification and scope of the appended claims. Moreover, it should be understood that compositions, as embodied herein, may also contain additional ingredients for imparting other desired properties to the compositions. In illustration, the compositions may contain anti-foam agents, e. g. of the silicone type, viscosity index improvers, and the like.

I claim:

1. A composition comprising a mineral oil of lubricating grade in major amount based on the weight of the composition and a small amount, sufficient to impart improved anti-oxidant characteristics to said oil, of dimethyl-bis-(p-dimethylaminophenyl)-silane.

2. A composition comprising a mineral oil in major amount based on the weight of the composition and a small amount, sufficient to impart improved anti-oxidation characteristics to said oil, of an oil-soluble silicon- and nitrogen-containing compound of the following formula:

wherein R' is a dialkylaminoaryl radical from the group consisting of dialkylaminophenyl and dialkylaminonaphthyl radicals and in which each of the alkyl groups contains one to four carbon atoms and R is a member from the group consisting of an alkyl radical of one to four carbon atoms and a p-dialkylaminoaryl radical from the group consisting of p-dialkylaminophenyl and p-dialkylaminonaphthyl radicals and in which each of the alkyl groups contains from one to four carbon atoms.

3. A composition comprising a mineral oil of lubricating grade in major amount based on the weight of the composition and a small amount, sufficient to impart improved anti-oxidant characteristics to said oil, of diethyl-bis-(p-dimethylaminophenyl)-silane.

4. A composition comprising a mineral oil of lubricating grade in major amount based on the weight of the composition and a small amount, sufficient to impart improved anti-oxidant characteristics to said oil, of dimethyl-bis-(p-diethylaminophenyl)-silane.

5. A composition comprising a mineral oil of lubricating grade in major amount based on the weight of the composition and a small amount, sufficient to impart improved anti-oxidant characteristics to said oil, of trimethyl(p-dimethylaminophenyl)-silane.

6. A composition comprising a mineral oil of lubricating grade in major amount based on the weight of the composition and a small amount, sufficient to impart improved anti-oxidant characteristics to said oil, of dimethyl-bis-(dimethylaminonaphthyl)-silane.

References Cited in the file of this patent
UNITED STATES PATENTS
2,561,178   Burkhard _____ July 17, 1951